(12) United States Patent
White et al.

(10) Patent No.: US 9,654,167 B1
(45) Date of Patent: May 16, 2017

(54) SMARTPHONE CASE SYSTEM

(71) Applicants: Lindsay E. White, New York, NY (US); Sharon White, New York, NY (US)

(72) Inventors: Lindsay E. White, New York, NY (US); Sharon White, New York, NY (US)

( * ) Notice: Subject to any disclaimer, the term of this patent is extended or adjusted under 35 U.S.C. 154(b) by 0 days.

(21) Appl. No.: 15/247,521

(22) Filed: Aug. 25, 2016

(51) Int. Cl.
| | | |
|---|---|---|
| H04M 1/00 | (2006.01) | |
| H04B 5/00 | (2006.01) | |
| H04M 1/66 | (2006.01) | |
| H04B 1/3888 | (2015.01) | |
| A45C 11/00 | (2006.01) | |
| A45F 5/00 | (2006.01) | |
| A45C 13/30 | (2006.01) | |
| A45C 13/20 | (2006.01) | |

(52) U.S. Cl.
CPC ............ H04B 1/3888 (2013.01); A45C 11/00 (2013.01); A45C 13/20 (2013.01); A45C 13/30 (2013.01); A45F 5/00 (2013.01); *A45C 2011/002* (2013.01); *A45F 2005/006* (2013.01)

(58) Field of Classification Search
CPC ...... H04M 1/026; H04M 1/04; H04M 1/0249; H04M 1/7253; H04M 1/72527; H04M 1/72575; H04M 1/72577; H04M 2250/02; H04M 2250/04; H04B 1/38; H04B 1/3888; H04B 5/00; H04B 5/02; H04B 5/0062; H04W 4/008; H04W 12/06; H04W 12/08; H04W 88/02
USPC .......... 455/41.1, 41.2, 90.3, 410, 557, 575.1, 455/575.8
See application file for complete search history.

(56) References Cited

U.S. PATENT DOCUMENTS

| | | | | |
|---|---|---|---|---|
| 6,655,540 | B2 * | 12/2003 | Shimoda ............... | G06F 1/1626 455/575.1 |
| 6,771,981 | B1 * | 8/2004 | Zalewski ............... | B67D 7/145 455/557 |
| 6,855,883 | B1 | 2/2005 | Matsui | |
| 6,859,657 | B1 * | 2/2005 | Barnard ............... | A61B 5/0028 455/41.1 |
| 7,719,425 | B2 | 5/2010 | Colby | |
| 7,830,672 | B1 | 11/2010 | Kitchen | |
| 8,237,549 | B2 | 8/2012 | Horne | |
| 8,428,664 | B1 * | 4/2013 | Wyers ................... | H04M 1/185 455/575.1 |
| 8,504,126 | B1 | 8/2013 | Maravilla et al. | |
| 8,577,412 | B1 * | 11/2013 | Bishop ................ | H04M 1/0281 455/575.1 |

(Continued)

FOREIGN PATENT DOCUMENTS

WO  WO2006107397  10/2006

*Primary Examiner* — Quochien B Vuong (57) ABSTRACT

A smartphone case system includes an electronic device that has a transceiver. The transceiver is in electrical communication with a communication network. A case is provided and the electronic device is positioned in the case. Thus, the case protects the electronic device. A strap is coupled to the case and the strap is spaced from the case. Thus, a hand may be passed between the strap and the case thereby facilitating the case to be gripped. A security chip is embedded within the case. The security chip is electrical communication with the communication network. Moreover, the security chip inhibits an unauthorized user from electronically gaining identity data from the electronic device.

9 Claims, 9 Drawing Sheets

(56) References Cited

U.S. PATENT DOCUMENTS

| | | | |
|---|---|---|---|
| 8,774,716 B2* | 7/2014 | Chan | H04B 5/0062 455/41.1 |
| D712,388 S | 9/2014 | Jia et al. | |
| D721,685 S | 1/2015 | Hasbrook et al. | |
| D726,174 S | 4/2015 | Wahlin | |
| 2005/0079820 A1* | 4/2005 | Yamashita | G06K 7/0008 455/41.2 |
| 2015/0156301 A1* | 6/2015 | Crawford | H04M 1/0262 455/557 |

* cited by examiner

SMARTPHONE CASE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to case devices and more particularly pertains to a new case device for protecting information on an electronic device.

BRIEF SUMMARY OF THE INVENTION

An embodiment of the disclosure meets the needs presented above by generally comprising an electronic device that has a transceiver. The transceiver is in electrical communication with a communication network. A case is provided and the electronic device is positioned in the case. Thus, the case protects the electronic device. A strap is coupled to the case and the strap is spaced from the case. Thus, a hand may be passed between the strap and the case thereby facilitating the case to be gripped. A security chip is embedded within the case. The security chip is electrical communication with the communication network. Moreover, the security chip inhibits an unauthorized user from electronically gaining identity data from the electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 10 thereof, a new case device embodying the principles and concepts of an embodiment of the disclosure and generally designated by the reference numeral 10 will be described.

As best illustrated in FIGS. 1 through 10, the smartphone case system 10 generally comprises an electronic device 12. The electronic device 12 has a transceiver 14. The transceiver 14 is in electrical communication with a communication network 16. The electronic device 12 may be a smart phone or the like. The transceiver 14 may be a radio frequency transceiver 14 or the like. The communication network 16 may be a cellular phone network, the internet, or other similar communication network 16.

A case 18 is provided. The electronic device 12 is positioned in the case 18 to protect the electronic device 12. The case 18 is comprised of a reliantly compressible material. Thus, the case 18 absorbs impact shock. The case 18 has a first wall 20 and a perimeter wall 22 extending away from the first wall 20. The perimeter wall 22 is coextensive with a perimeter of the first wall 20. The perimeter wall 22 has a distal edge 24 with respect to the first wall 20 and the distal edge 24 defines an opening 26 into the case 18.

The perimeter wall 22 has a top side 28, a bottom side 30 and a first lateral side 32. The first wall 20 has an outer surface 34. The first wall 20 has a first opening 36 extending therethrough to expose a camera on the electronic device 12. The perimeter wall 22 has a second opening 38 extending therethrough to expose buttons on the electronic device 12.

A strap 40 is provided and the strap 40 is coupled to the case 18. The strap 40 is spaced from the case 18. Thus, the strap 40 may have a hand 41 passed between the strap 40 and the case 18 thereby facilitating the case 18 to be gripped. The strap 40 is positioned on the outer surface 34 of the first wall 20. Moreover, the strap 40 extends between the top side 28 and the bottom side 30 of the case 18. The strap 40 is spaced from the outer surface 34 of the case 18.

A ring 42 is coupled to the case 18. The ring 42 is positioned on the bottom side 30 of side case 18. A cord 44 is provided and the cord 44 is coupled to the case 18. The cord 44 may be coupled to a user 46 thereby inhibiting the case 18 from being lost or stolen. The cord 44 has a first end 48 and a second end 50. Moreover, the cord 44 may be a coiled cord 44 or lanyard with a retracting half.

A first coupler 52 is provided. The first coupler 52 is coupled to the first end 48 of the cord 44 and the first coupler 52 may be manipulated. The first coupler 52 removably engages the ring 42 such that the cord 44 is coupled to the ring 42. The first coupler 52 may comprise a lobster claw coupler or the like.

Figure 1:
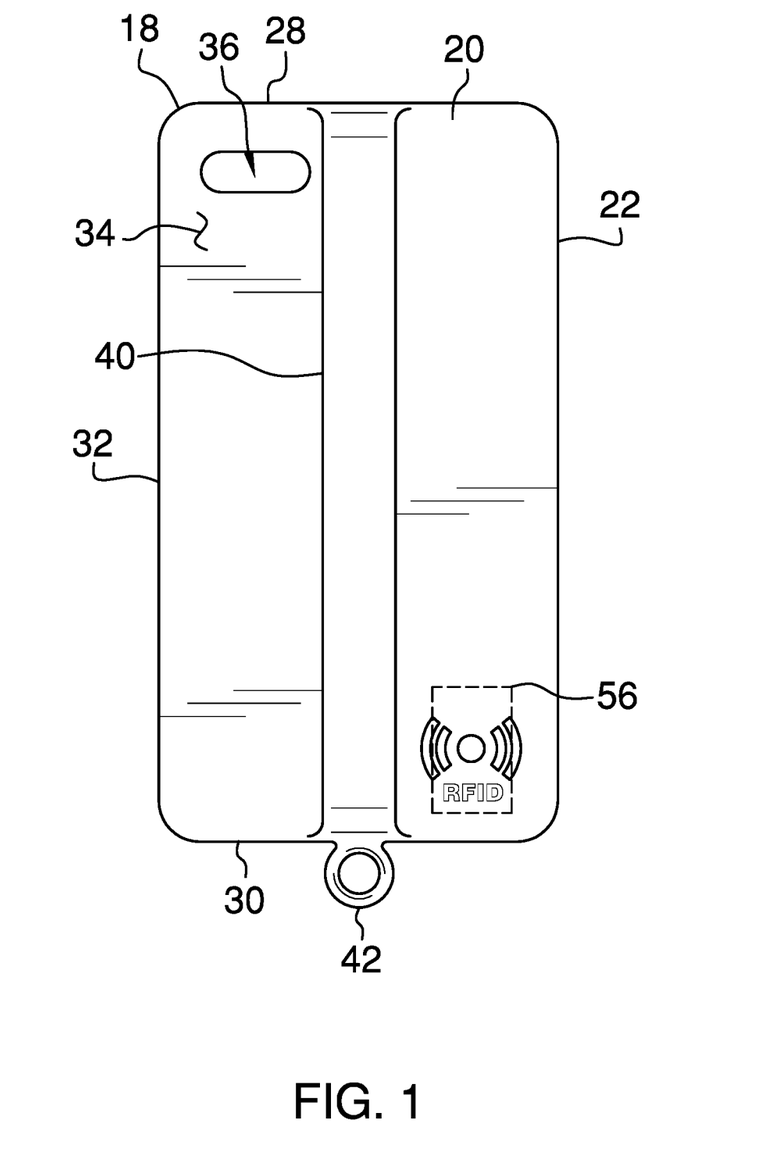
FIG. 1 is a back view of a smartphone case system according to an embodiment of the disclosure.
Figure 2:
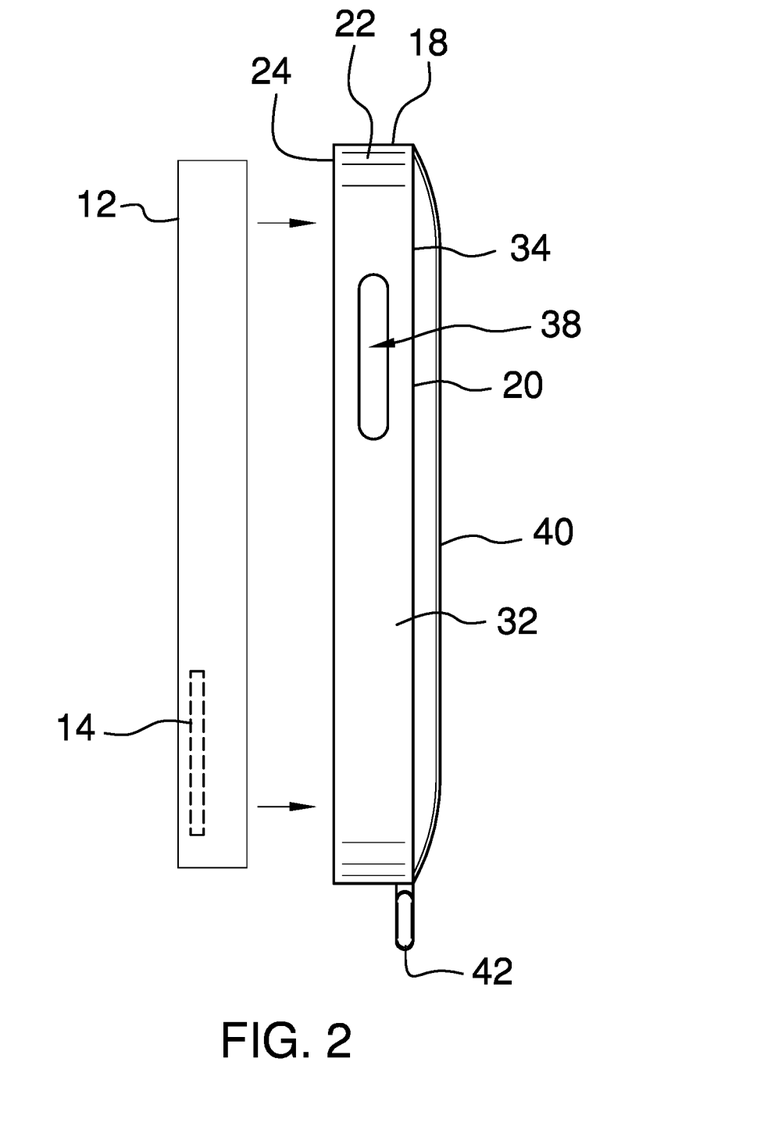
FIG. 2 is a left side view of an embodiment of the disclosure.
Figure 3:
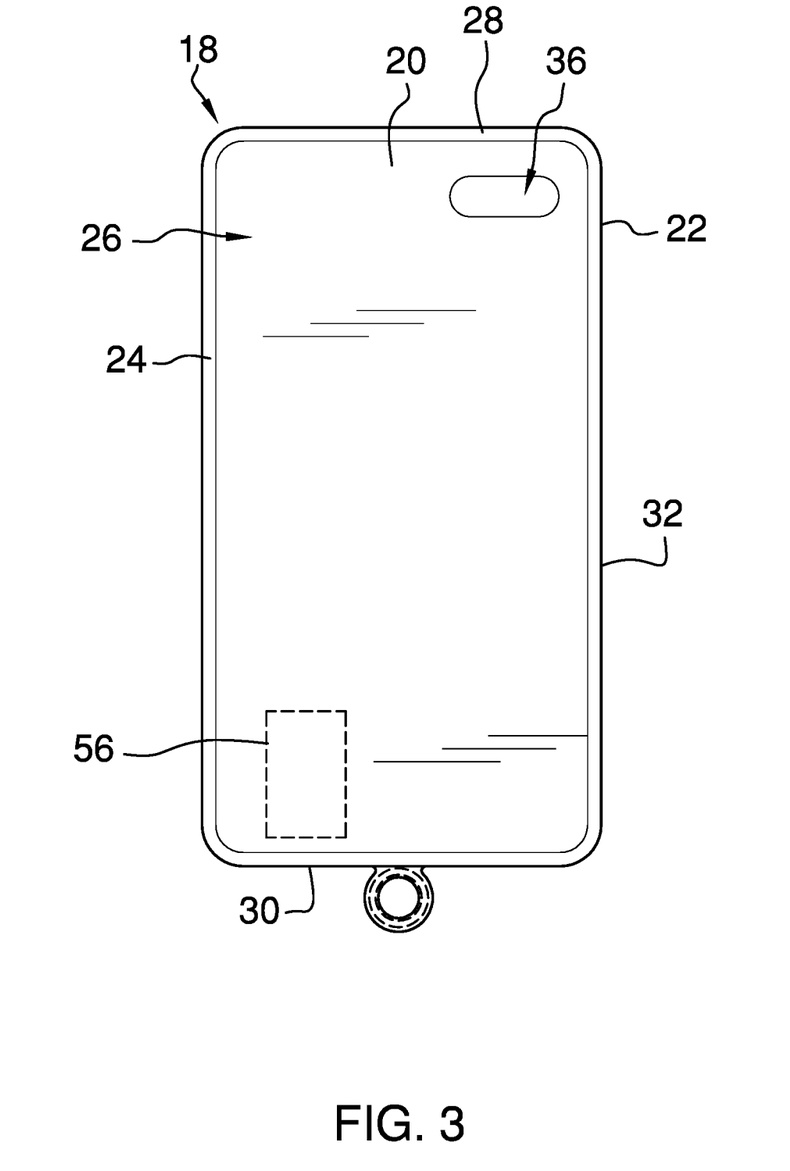
FIG. 3 is a front view of an embodiment of the disclosure.
Figure 4:
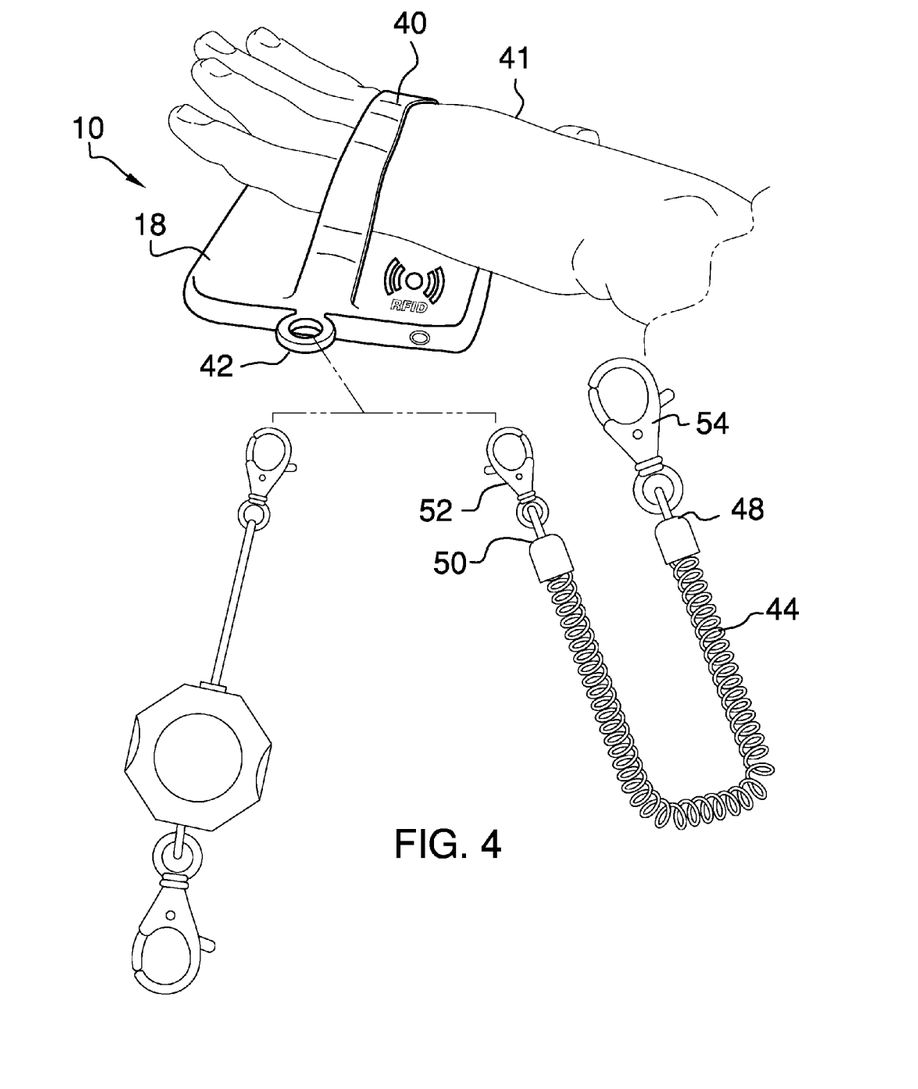
FIG. 4 is a perspective in-use view of an embodiment of the disclosure.
Figure 5:
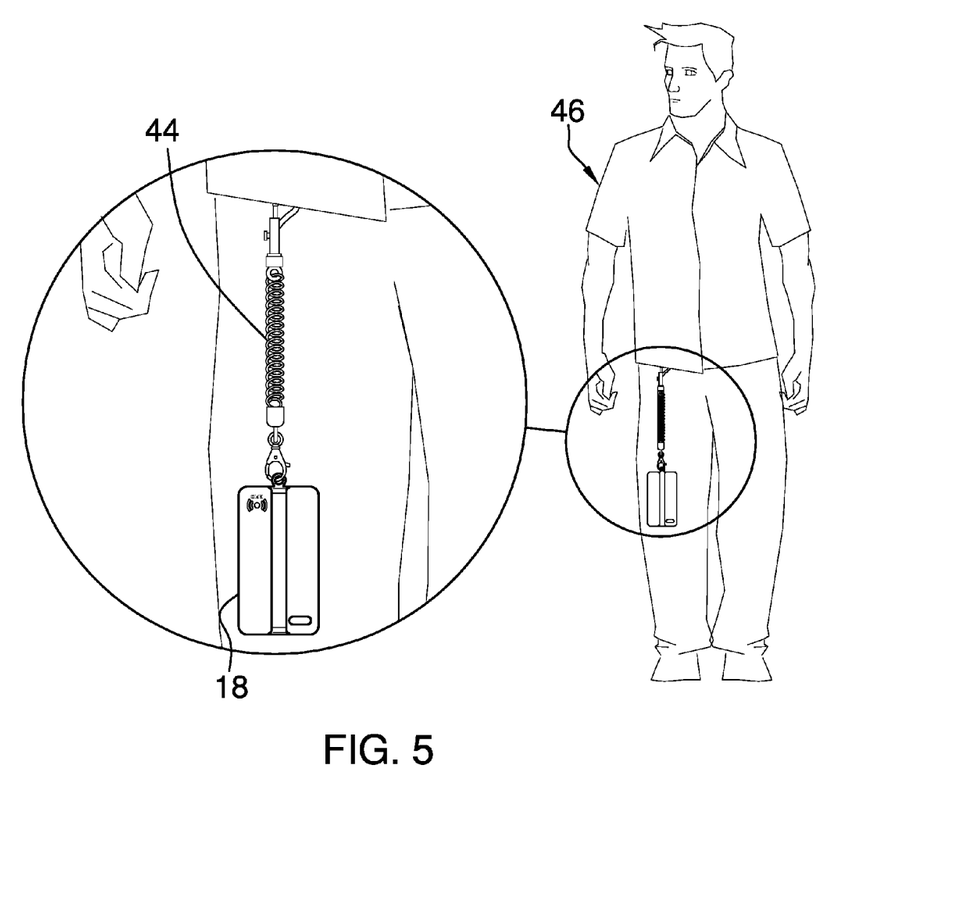
FIG. 5 is a front perspective in-use view of an embodiment of the disclosure.
Figure 6:
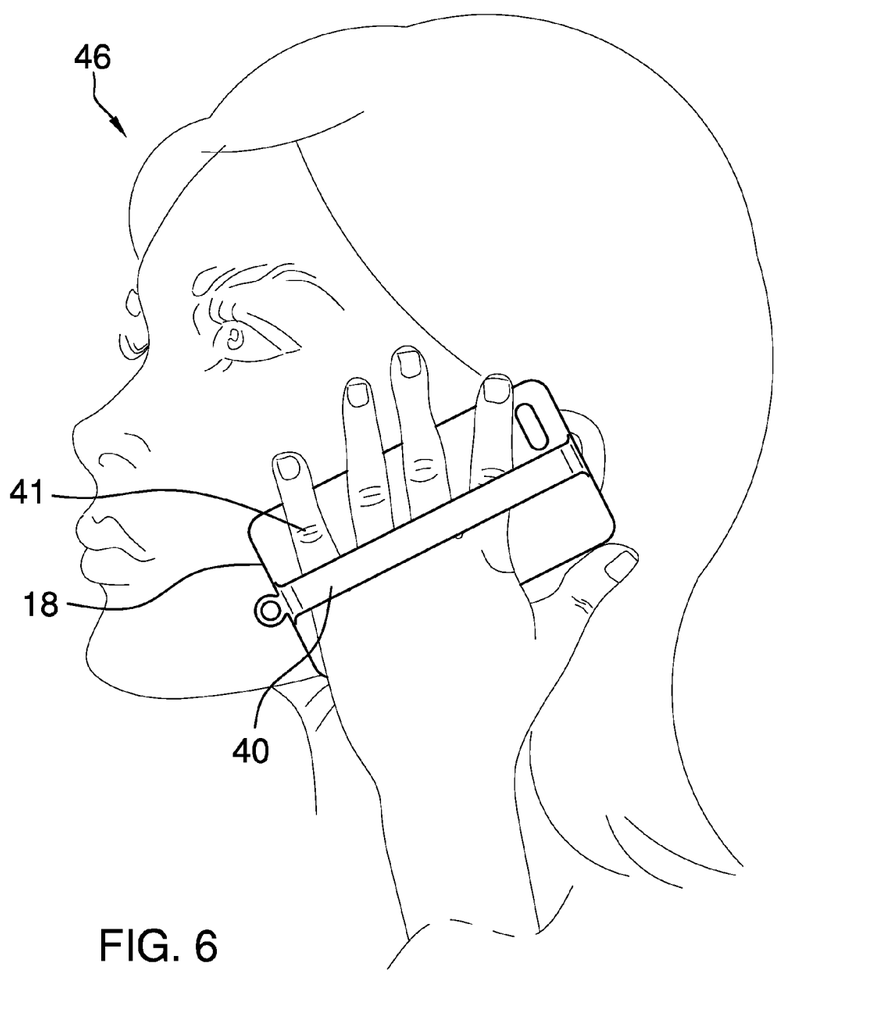
FIG. 6 is a side perspective in-use view of an embodiment of the disclosure.
Figure 7:
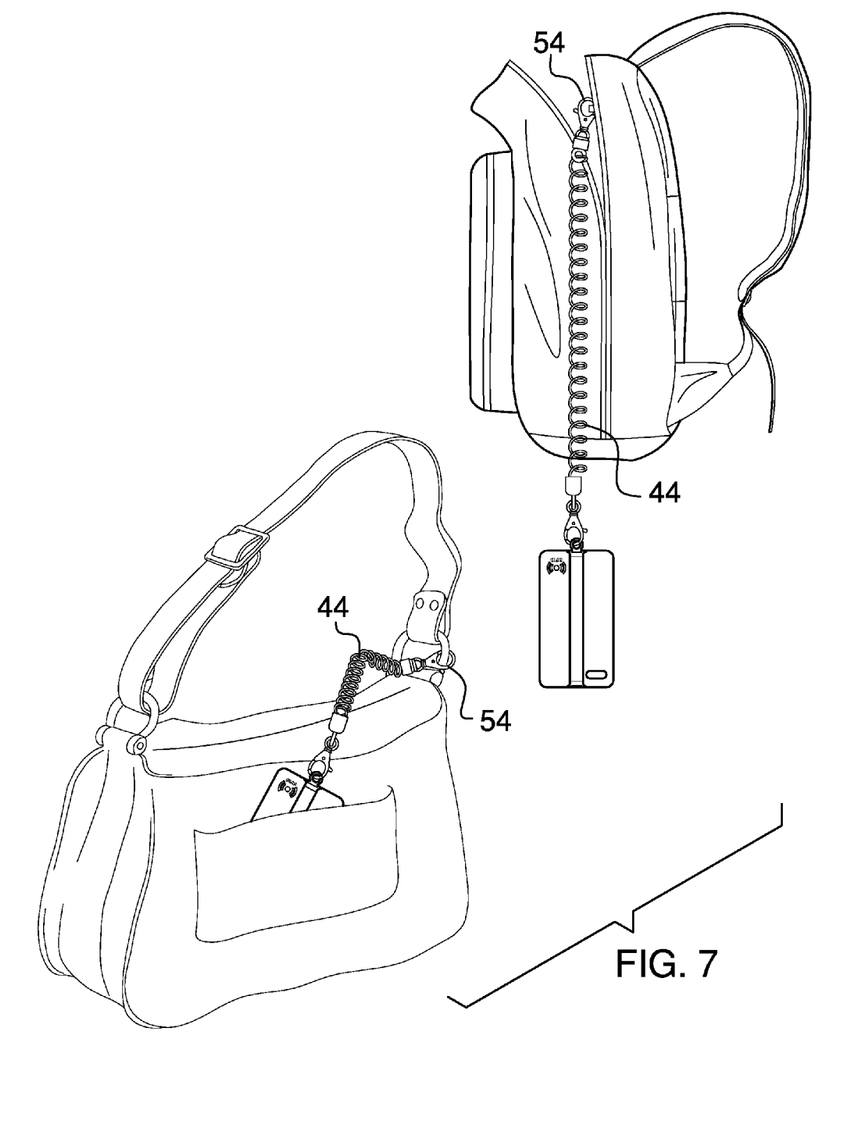
FIG. 7 is a perspective in-use view of a cord of an embodiment of the disclosure.

A second coupler 54 is provided. The second coupler 54 is coupled to the second end 50 of the cord 44 and the second coupler 54 is may be manipulated. The second coupler 54 may engage clothing thereby facilitating the case 18 to be coupled to the clothing. The second coupler 54 may be a lobster claw coupler or the like. As shown in FIG. 7, the second coupler 54 may engage a purse or the like.

A security chip 56 is provided. The security chip 56 is embedded within the case 18. The security chip 56 is in electrical communication with the communication network 16. Moreover, the security chip 56 inhibits an unauthorized user 46 from electronically gaining identity data from the electronic device 12.

Figure 8:
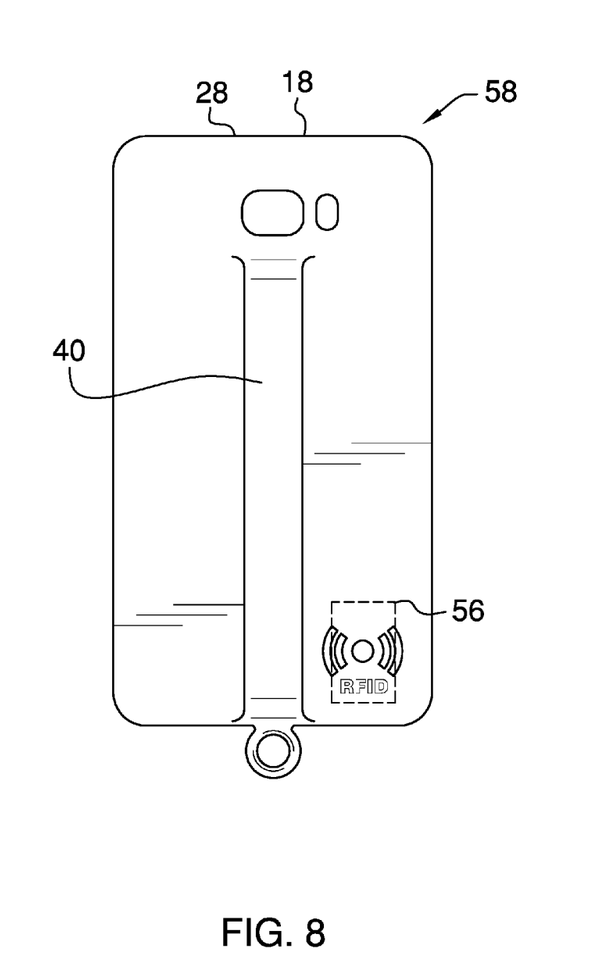
FIG. 8 is a back view of an alternative embodiment of the disclosure.
Figure 9:
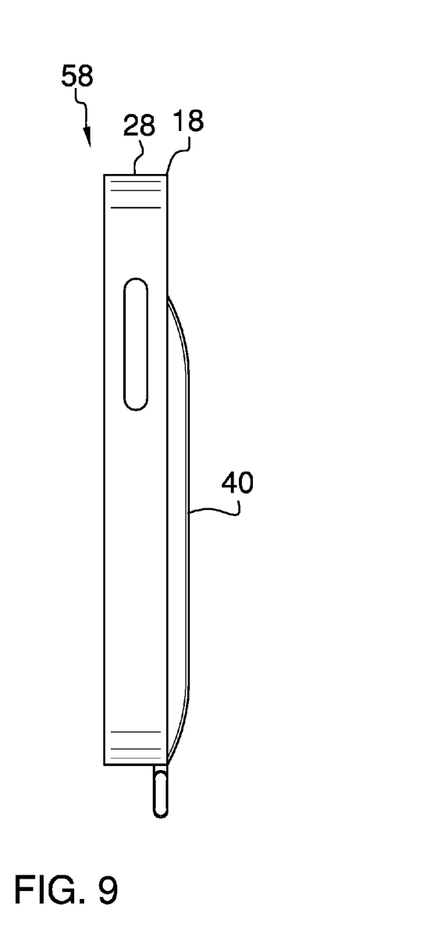
FIG. 9 is a left side view of an alternative embodiment of the disclosure.
Figure 10:
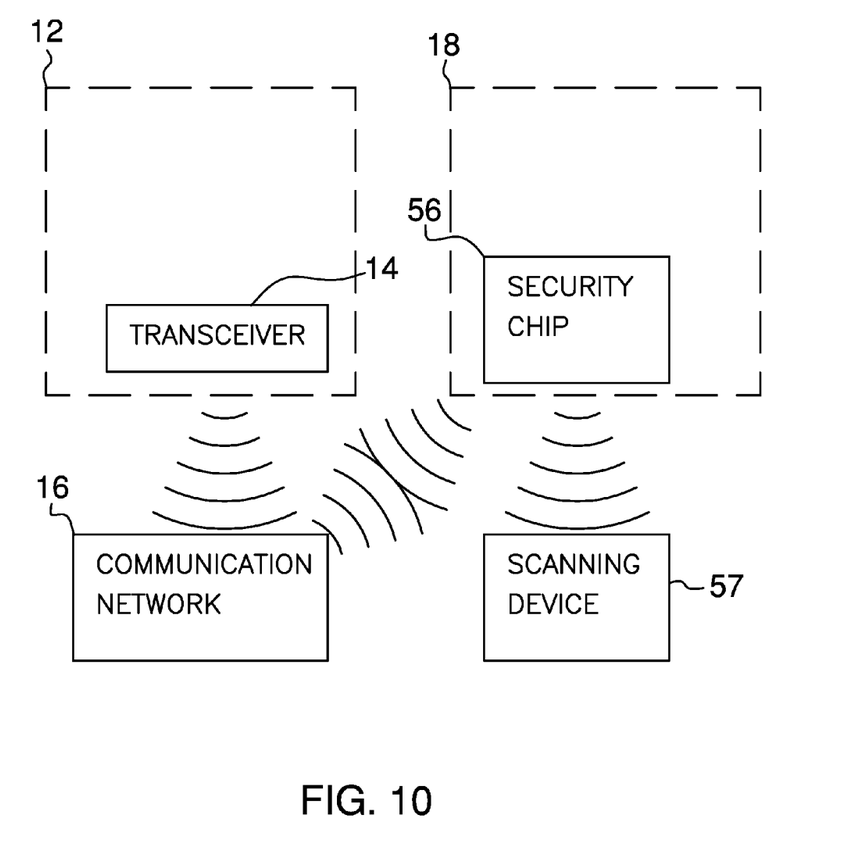
FIG. 10 is a schematic view of an embodiment of the disclosure.

The security chip 56 may be a passive RFID chip or the like. The security chip 56 detects when a scanning device 57 is placed in electronic communication with the transceiver 14 in the electronic device 12. The scanning device 57 may be any electronic scanning device. The security chip 56 inhibits the scanning device 57 from communicating with the electronic device 12 through any conventional electromagnetic means including, but not being limited to, signal blocking and cryptology. Thus, the security chip 56 protects personal data contained on the electronic device 12. In an alternative embodiment 58 as shown in FIGS. 8 and 9, the strap 40 may be spaced from the top side 28 of the case 18. A pair of first openings 36 may be positioned between the strap 40 and the top side 28.

In use, the electronic device 12 is positioned in the case 18. The case 18 is manipulated in the convention of smart phone usage. The cord 44 is coupled between the case 18 and the clothing. Thus, the electronic device 12 is tethered to a user 46. The security chip 56 inhibits an unauthorized user 46 from electronically communicating with the electronic device 12. Thus, the user 46's personal data stored in the electronic device 12 is protected.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A smartphone case system being configured to inhibit electronic identity theft, said system comprising:
   an electronic device having a transceiver, said transceiver being configured to be in electrical communication with a communication network;
   a case having said electronic device being positioned therein wherein said case is configured to protect said electronic device;
   a strap being coupled to said case, said strap being spaced from said case wherein said strap is configured to have a hand passed between said strap and said case thereby facilitating said case to be gripped; and
   a security chip being embedded within said case wherein said security chip is configured to be in electrical communication with the communication network thereby facilitating said security chip to inhibit an unauthorized user from electronically gaining identity data from said electronic device.

2. The system according to claim 1, wherein said case has a first wall and a perimeter wall extending away from said first wall, said perimeter wall being coextensive with a perimeter of said first wall, said perimeter wall having a distal edge with respect to said first wall, said distal edge defining an opening into said case, said perimeter wall having a top side, a bottom side and a first lateral side, said first wall having an outer surface.

3. The system according to claim 2, wherein said first wall has a first opening extending therethrough such that said first opening exposes a camera on said electronic device, said perimeter wall having a second opening extending therethrough such that said second opening exposes buttons on said electronic device.

4. The system according to claim 2, wherein said strap is positioned on said outer surface of said first wall, said strap extending between said top side and said bottom side of said case, said strap being spaced from said outer surface.

5. The system according to claim 2, further comprising a ring being coupled to said case, said ring being positioned on said bottom side of side case.

6. The system according to claim 1, further comprising a cord being coupled to said case wherein said cord is configured to be coupled to a user thereby inhibiting said case from being lost or stolen, said cord having a first end and a second end.

7. The system according to claim 6, further comprising:
   a ring being coupled to said case; and
   a first coupler being coupled to said first end wherein said first coupler is configured to be manipulated, said first coupler removably engaging said ring such that said cord is coupled to said ring.

8. The system according to claim 6, further comprising a second coupler being coupled to said second end wherein said second coupler is configured to be manipulated, said second coupler being configured to engage clothing thereby facilitating said case to be coupled to the clothing.

9. A smartphone case system being configured to inhibit electronic identity theft, said system comprising:
   an electronic device having a transceiver, said transceiver being configured to be in electrical communication with a communication network;

a case having said electronic device being positioned therein wherein said case is configured to protect said electronic device, said case having a first wall and a perimeter wall extending away from said first wall, said perimeter wall being coextensive with a perimeter of said first wall, said perimeter wall having a distal edge with respect to said first wall, said distal edge defining an opening into said case, said perimeter wall having a top side, a bottom side and a first lateral side, said first wall having an outer surface, said first wall having a first opening extending therethrough such that said first opening exposes a camera on said electronic device, said perimeter wall having a second opening extending therethrough such that said second opening exposes buttons on said electronic device;

a strap being coupled to said case, said strap being spaced from said case wherein said strap is configured to have a hand passed between said strap and said case thereby facilitating said case to be gripped, said strap being positioned on said outer surface of said first wall, said strap extending between said top side and said bottom side of said case, said strap being spaced from said outer surface;

a ring being coupled to said case, said ring being positioned on said bottom side of side case;

a cord being coupled to said case wherein said cord is configured to be coupled to a user thereby inhibiting said case from being lost or stolen, said cord having a first end and a second end;

a first coupler being coupled to said first end wherein said first coupler is configured to be manipulated, said first coupler removably engaging said ring such that said cord is coupled to said ring;

a second coupler being coupled to said second end wherein said second coupler is configured to be manipulated, said second coupler being configured to engage clothing thereby facilitating said case to be coupled to the clothing; and a security chip being embedded within said case wherein said security chip is configured to be in electrical communication with the communication network thereby facilitating said security chip to inhibit an unauthorized user from electronically gaining identity data from said electronic device.

* * * * *